United States Patent [19]

Bruederle

[11] Patent Number: 5,702,067
[45] Date of Patent: Dec. 30, 1997

[54] METHOD AND APPARATUS FOR DETERMINING THE ANGULAR MOMENTUM VECTOR OF A SATELLITE

[75] Inventor: Ernst Bruederle, Ottobrunn, Germany

[73] Assignee: Daimler-Benz Aerospace AG, Germany

[21] Appl. No.: 526,566

[22] Filed: Sep. 11, 1995

[30] Foreign Application Priority Data

Sep. 10, 1994 [DE] Germany .................. P 44 32 265.8

[51] Int. Cl.$^6$ .................................................. B64G 1/36
[52] U.S. Cl. .................................... 244/170; 244/166
[58] Field of Search .......................... 244/170, 164, 244/165, 167, 168, 169, 171; 310/DIG. 3

[56] References Cited

U.S. PATENT DOCUMENTS

| | | | |
|---|---|---|---|
| 3,228,628 | 1/1966 | Chubb | 244/166 |
| 3,232,561 | 2/1966 | Adams | 244/166 |
| 3,429,524 | 2/1969 | Buckingham et al. | 244/166 |
| 3,681,583 | 8/1972 | Kubo et al. | 244/166 |
| 5,047,945 | 9/1991 | Paluszek | 244/166 |

FOREIGN PATENT DOCUMENTS

| | | |
|---|---|---|
| 0 544 242A1 | 6/1993 | European Pat. Off. . |
| 2 659 061 | 9/1991 | France . |

OTHER PUBLICATIONS

"Spinning Spacecraft Attitude Control via the Environmental Magnetic Field", Journal of Spacecraft and Rockets, vol. 4, No. 12, Dec. 1967.

"Magnetotorquing for the Attitude Control of Geostationary Satellites", Proceedings of AOCS Conference, Nov. 1977 (the Netherlands).

"Attitude Motion of a Nonattitude–Controlled Cylindrical Satellite", Journal of Guidance, Control and Dynamics, vol. 13, No. 3, Jun. 1990.

European Search Report dated Jan. 10, 1997.

*Primary Examiner*—Andres Kashnikow
*Assistant Examiner*—Tien Dinh
*Attorney, Agent, or Firm*—Evenson, McKeown, Edwards & Lenahan, P.L.L.C.

[57] ABSTRACT

The invention relates to a method for determining the angular momentum vector of a satellite, located in an external magnetic field, relative to a satellite-integral orthogonal system of coordinates. The satellite has a torque generating system to generate pulse-shaped torques around all three axes. A magnetometer measuring on three axes is used, whose measured values are fed to a computer. In the latter, at successive points in time and using the current measured values, an observer equation is integrated, with new estimated values being determined for the angular momentum vector. Using these as well as the current measured values, an inequality is continuously checked; when it is not fulfilled, the torque generating system operates briefly, so that finally the fulfillment of the inequality is forced and identity of the last estimated value that has been determined with the rotary pulse vector to be determined is achieved.

6 Claims, 1 Drawing Sheet

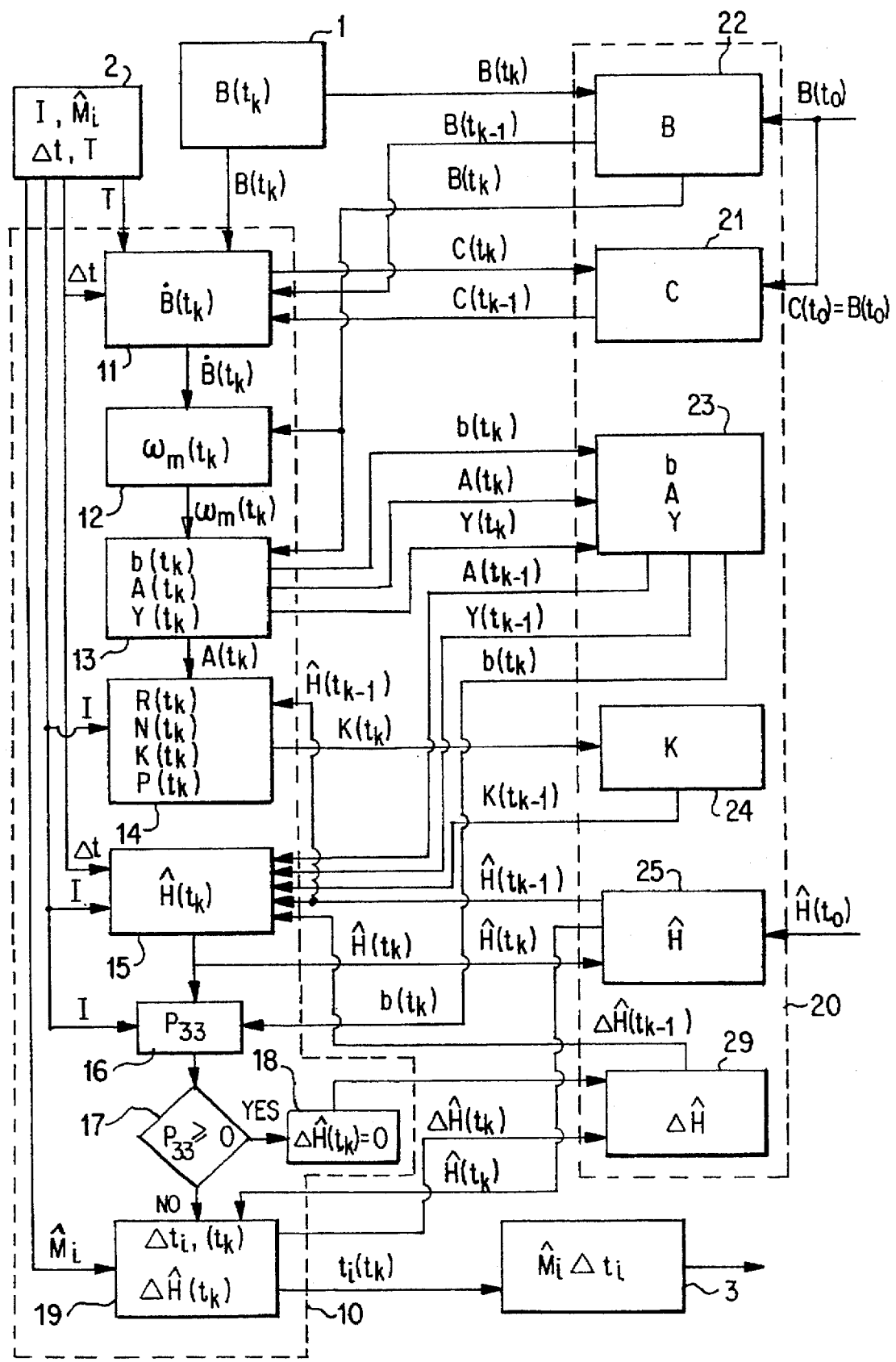

METHOD AND APPARATUS FOR DETERMINING THE ANGULAR MOMENTUM VECTOR OF A SATELLITE

BACKGROUND AND SUMMARY OF THE INVENTION

The invention relates to a method and apparatus for determining the angular momentum vector of a satellite located in an external magnetic field relative to a satellite integral orthogonal system of coordinates.

In satellites, especially earth satellites, it is frequently necessary to determine the rotational speed (rotational speed vector ω), or the angular momentum vector H which is related to rotational speed by the inertia matrix of the satellite. This need arises not only when the satellite has already reached its final circumferential orbit, but also when it is still on the transfer orbit. Knowing the angular momentum vector or the rotational speed is necessary, for example, to establish the initial state of the satellite before commencing position control maneuvers, and to control its movement during the performance of such a maneuver. It is also necessary in order to check the resultant final state.

Usually special sensors such as gyroscope packages and solar sensor arrays are used to determine the rotational speed. Gyroscope packages have the disadvantage that they are expensive and suffer from a certain functional risk, so that redundant design is necessary. Using solar sensors for the same purpose is disadvantageous because they cannot supply any measured values when the spacecraft is in the earth's shadow, and are also subject to limitations of the visual field.

The goal of the present invention is to provide a highly reliable arrangement for determining satellite angular momentum which minimizes equipment cost, and which in particular avoids the above-mentioned disadvantages of the previous methods.

This goal is achieved by the method and apparatus according to the invention, which uses only the measured values of a magnetometer along three axes to determine the angular momentum vector H. (It is presumed that the satellite is in an external magnetic field B. This assumption is always fulfilled in earth satellites, especially those that are in low circular orbits that are inclined relative to the plane of the Equator, and are used preferentially.) Measured values from other measuring instruments are therefore not required. In particular, the use of expensive gyroscope packages and solar sensors are eliminated.

According to the invention, the measured values from the magnetometer are fed to a computer, where they are processed to derive an estimated value $\hat{H}$ of the angular momentum vector. The process is an iterative one in which $\hat{H}$ is estimated repeatedly, with the current measured values of the magnetometer being entered each time the integration is performed, and with new estimated values for $\hat{H}$ resulting each time. The estimated values converge with the desired angular momentum vector H which is thus obtained directly as a result of repeated integration. Besides the measured values from the magnetometer, the computer also receives as parameters the known elements of the inertia matrix of the satellite, it being assumed that a satellite-integral orthogonal system of coordinates serves as the basis, whose axes coincide with the principal inertia axes of the satellite.

The repeated integrations are initially performed without additional measures until the check of a condition (in the form of an inequality) indicates that a small change in the angular momentum of the satellite must be performed with the aid of a torque generating system of the satellite, for example by orientation control jets or other momentum generators that may be provided. In addition to the new estimated value $\hat{H}$ just determined, the current measured values of the magnetometer and the inertia matrix of the satellite enter into this condition, and the required change in angular momentum $\Delta \hat{H}$ is dimensioned so that it results in the inequality being satisfied.

The invention takes advantage of the fact that an external magnetic field can be used as a reference not only for orienting the satellite, but also for its rotation. However, while an exact knowledge of the magnetic field must be presumed to determine its orientation, the same is not absolutely necessary for determining the angular momentum vector of the satellite, as will be shown below. Successful implementation of the method according to the invention is likewise not prevented by the fact that the external magnetic field is constantly changing in magnitude and direction, as is the case for example in a steeply inclined circular near-earth orbit. Thus, although the direct measurements of the magnetometer can only pick up those components of the angular momentum vector H that are oriented perpendicularly to the external magnetic field, this difficulty may be overcome by a suitable choice of the observer equation to be integrated repeatedly, and of the values occurring therein.

Thus, according to the invention, in addition to the computer itself, a magnetometer and a torque generating system are used to measure the components of the external magnetic field and to generate torque pulses, which deliberately produce a small change in the angular momentum of the satellite. Constantly updated measured values are required for a certain period of time, and the torque generating system may have to be used several times.

The invention is based on the fact that the following relationship exists between an external magnetic field (magnetic field vector B) and the rotational speed vector ω of the satellite:

$$\dot{B} + \omega \times B = Q \dot{B}_i \qquad (1)$$

in which the vectors ω and B are expressed in relation to the satellite-integral system of coordinates, while vector $B_i$ represents the magnetic field vector in an inertial system of coordinates and Q represents the transformation matrix from an inertial to a satellite-integral system of coordinates. This equation also takes into account the fact that the external magnetic field can change locally. This is expressed in the equation as the rate of change with respect to time $\dot{B}_i$ (that is, the first time derivative of $B_i$) of the inertial magnetic field vector, and includes the transformation matrix Q that relates the two systems of coordinates.

If the satellite orbit (and hence the external magnetic field associated with it) as well as the position of the satellite are not known sufficiently accurately, the following system of equations can be prepared, disregarding the righthand side of Equation (1):

$$\dot{B}_m + \omega \times B_m = 0 \qquad (2)$$

$$\omega_m \cdot B_m = 0. \qquad (3)$$

Equation (2) contains as measured values the magnetic field vector $B_m$ (which is defined in the satellite-integral system of coordinates, and unavoidably includes measurement errors) as well as the rotational speed vector $\omega_m$ (which can be derived from $B_m$). In this equation, errors in the magnetic field measurements and (as noted above) the right-hand side of Equation (1) are disregarded. Moreover, this equation does not include any component of the real rotational speed vector $\omega$ that may be oriented parallel to magnetic field vector $B_m$. The latter is expressed in Equation (3). The solution to the system of equations is given by:

$$\omega_m = \frac{1}{|B|} \begin{pmatrix} 0 & b_z & -b_y \\ -b_z & 0 & b_x \\ b_y & -b_x & 0 \end{pmatrix} \begin{pmatrix} \dot{B}_{mx} \\ \dot{B}_{my} \\ \dot{B}_{mz} \end{pmatrix} = \frac{\dot{B} \times B_m}{|B|^2} \quad (4)$$

where the normalized magnetic field vector b is as follows:

$$b \equiv \frac{B_M}{|B|}, \quad (5)$$

wherein:

$$|B| = \sqrt{B_{mx}^2 + B_{my}^2 + B_{mz}^2}.$$

A quadratic matrix A of rank 3, with three mutually orthogonal line vectors, is then introduced, one of which (for example the one in the third line) is identical to the normalized magnetic field vector b:

$$A \equiv (a_1, a_2, a_3)^T = \begin{pmatrix} a_{11} & a_{12} & a_{13} \\ a_{21} & a_{22} & a_{23} \\ b_x & b_y & b_z \end{pmatrix} \quad (6)$$

with the following expressions expressing orthogonality:

$$a_1 \cdot a_2 = a_1 \cdot b = a_2 \cdot b = 0 \quad (7)$$

as well as the additional properties $$a_1^2 = a_2^2 = 1$$
$$detA = 1, A^{-1} = A^T. \quad (8)$$

If $|b_z|=1$, $a_1$ and $a_2$ can be chosen as follows:

$$a_1 = (1,0,0)^T, a_2 = (0,1,0)^T signb_z.$$

Otherwise the following can be used for example for the two line vectors $a_{1,2}$:

$$a_1 \equiv (a_{11}, a_{12}, a_{13})^T = \left( \frac{-b_y}{\sqrt{b_x^2 + b_y^2}}, \frac{b_x}{\sqrt{b_x^2 + b_y^2}}, 0 \right)^T \quad (10)$$

$$a_2 \equiv (a_{21}, a_{22}, a_{23})^T = \left( \frac{-b_x b_y}{\sqrt{b_x^2 + b_y^2}}, \frac{-b_y b_z}{\sqrt{b_x^2 + b_y^2}}, \sqrt{b_x^2 + b_y^2} \right)^T$$

with the above conditions again being observed.

The rotational speed vector $\omega$, as mentioned above, can be resolved into parts that are oriented parallel to and vertical to the magnetic field vectors B and b:

$$\omega = \omega_p + \omega_s. \quad (12)$$

Because b is a unit vector, and $\omega_s$ is identical to the only measurable component $\omega_m$ that has already been mentioned, the above can be expressed as:

$$\omega = (\omega \cdot b)b + \omega_m. \quad (13)$$

Using matrix A, the following is obtained:

$$A\omega_m = A\omega - A(\omega \cdot b)b. \quad (14)$$

Finally, with $\omega = I^{-1}H$ and observing conditions (7) while introducing the new vector parameter Y:

$$Y \equiv A\omega_m = AI^{-1}H - (0,0,b\cdot\omega)^T. \quad (15)$$

Here $I^{-1}$ is the inverse matrix of inertia matrix I of the satellite.

The equation of motion of the satellite is:

$$\dot{H} + \omega \times H = M, \quad H = I\omega \quad (16)$$

where $\dot{H}$ is the time derivative of the angular momentum vector H and M is the vector of the acting external torque. In theory, if M and I are both known, the angular momentum vector H can be obtained by integration of this equation. However, since these values are not completely susceptible to measurement, the following observer equation is prepared by introducing estimated values $\hat{H}$, $\hat{\omega}$, and $\hat{M}$:

$$\dot{\hat{H}} + \hat{\omega} \times \hat{H} - I^{-1}A^T K(Y - AI^{-1}\hat{H}) = \hat{M}. \quad (17)$$

Here, in addition to the above-mentioned matrices A and the transposed matrix $A^T$ as well as $I^{-1}$ and the vector value Y defined in Equation (15), there is also a starting matrix K. The latter is determined so that, after repeated iteration of the observer equation (17) using repeatedly determined estimated values $\hat{H}$ and the respective current measured values b, the difference vector $$\epsilon \equiv H - \hat{H}$$

converges toward zero. Thus, the estimated value $\hat{H}$ determined with each of the repeated integration, finally matches the angular momentum vector H to be determined.

The following differential equation is obtained for vector value $\epsilon$ taking into account $\omega = I^{-1}H$ and Equation (15) by subtraction of (16) and (17):

$$\dot{\epsilon} + (I^{-1}H) \times H - (I^{-1}\hat{H}) \times \hat{H} + I^{-1}A^T K[AI^{-1}\epsilon - (0,0,b\cdot\omega)^T] = 0. \quad (18)$$

The vector term $(0,0,b\cdot\omega)^T$ that contains the parallel component of $\omega$ in direction b can be eliminated by setting all of the coefficients in the third column in the starting matrix K equal to zero:

$$K = \begin{pmatrix} k_{11} & k_{12} & 0 \\ k_{21} & k_{22} & 0 \\ k_{31} & k_{32} & 0 \end{pmatrix}. \quad (19)$$

There is a correlation between matrices A and K such that in K the coefficients are made equal to zero in precisely that column whose number coincides with the number of the line in A whose line vector is identical with the normalized magnetic field vector b. In the special case under discussion here, it is the third column of K and the third line of A that are involved. Observer equation (17), which contains as the vector equation three scalar equations for components $\hat{H}_i$ (i=x,y,z) must now be numerically integrated repeatedly at short time intervals, (taking into account a starting value for $\hat{H}$, for example $\hat{H}_i=0$), each time taking into account the latest measured value b by which matrix A is determined. This results in new estimated values $\hat{H}$ each time, which are used as starting values in the following integration. In order to assure that the difference $\epsilon$ converges toward zero in the foreseeable future, it is sufficient that:

$$\frac{d}{dt}\epsilon^2 - 2\epsilon^T \cdot \dot{\epsilon} \leq 0. \quad (20)$$

With a proper choice of the satellite integral system of coordinates (namely in accordance with the main inertia axes of the satellite), the inertia matrix I is a diagonal matrix, in which consequently only the diagonal coefficients $I_i$ (i=x, y,z) occur, according to $$I = \begin{pmatrix} I_x & 0 & 0 \\ 0 & I_y & 0 \\ 0 & 0 & I_z \end{pmatrix}. \qquad (21)$$

Thus, in view of condition (19), it follows from equation (18) and condition (20) that:

$$\epsilon^T \dot{\epsilon} = -u^T P u, \quad u \equiv A\Gamma^{-1}\epsilon \qquad (22)$$

with $$P \equiv \frac{1}{2} K + \frac{1}{2} K^T - N \qquad (23)$$

and $$R = \frac{1}{2} \begin{pmatrix} 0 & \hat{H}_z(I_y - I_x) & \hat{H}_y(I_x - I_z) \\ \hat{H}_z(I_y - I_x) & 0 & \hat{H}_x(I_z - I_y) \\ \hat{H}_y(I_x - I_z) & \hat{H}_x(I_z - I_y) & 0 \end{pmatrix}. \qquad (25)$$

Here, P, N, and R are quadratic matrices and the right-hand side of the first equation (22) has a quadratic form, for which condition (20) is known to be fulfilled when matrix P is positively definite or positively semi-definite. This is equivalent to saying that when matrix P is symmetrical, the following applies for its coefficients $P_{lm}$ (l,m=1,2,3) and for its determinants:

$$P_{11} \geq 0$$

$$P_{11}P_{22} - P_{12}^2 \geq 0 \qquad (26)$$

$$\det P \geq 0$$

where the > sign corresponds to the requirement that matrix P must be positively definite and the equality sign corresponds to the requirement that P must be positively semi-definite. In particular, all the diagonal elements of P must be larger than (positively definite) or equal to (positively semi-definite) zero.

As indicated by Equations (23) to (25), matrix P is determined by the coefficients of starting matrix K, measured values $b_i$ (i=x,y,z) (matrices A and $A^T$), and the coefficients $I_i$ of inertia matrix I and estimated values $\hat{H}_i$ of the components of the estimated angular momentum vector $\hat{H}$ (matrix R). When all the matrices are multiplied out, it develops that in the resultant matrix P a coefficient with the form $(Ib \times b)^T \hat{H}$ occurs that is independent of the coefficient $k_{lm}$ of matrix K and occurs at one place on the diagonal. From the requirements, it then follows that the following must be true:

$$(Ib \times b)^T \cdot \hat{H} \geq 0. \qquad (27)$$

A particularly skillful choice of the coefficients of matrix K without affecting limitation of generality, consists in the fact that when condition (19) is satisfied, a relationship is established between the remaining coefficients of K and coefficient $n_{lm}$ of matrix N such that the following is true:

$$K = \begin{pmatrix} n_{11} + c_1 & n_{12} & 0 \\ n_{12} & n_{22} + c_2 & 0 \\ 2n_{13} & 2n_{23} & 0 \end{pmatrix}. \qquad (28)$$

Here, P has the particularly simple form $$P = \begin{pmatrix} c_1 & 0 & 0 \\ 0 & c_2 & 0 \\ 0 & 0 & (Ib \times b)^T \hat{H} \end{pmatrix}. \qquad (29)$$

For coefficients $c_1$ and $c_2$, on the basis of equation (26), $c_{1,2} \geq 0$, which can always be achieved easily by appropriate setting.

The coefficients of matrix P all have the same dimension and consequently $C_{1,2}$ have the dimension of $I\hat{H}$ (b has dimension 1) or $I^2\omega$, i.e. (Nm sec$^2$)$^2$/sec. Accordingly, the following is suggested as one possibility for determining coefficients $c_{1,2}$:

$$c_1 = \frac{I_x^2}{3}, \quad c_2 = \frac{I_y^2}{3}. \qquad (30)$$

Hence, the requirement that $c_{1,2}$ be greater than 0 is met. The corresponding requirement is also met for the remaining coefficients $P_{33}$ of matrix P. For this purpose, after each integration that is performed that supplies a new value for $\hat{H}$, using the corresponding latest measured value for b, it is necessary to check whether inequality (27) is fulfilled or not. If so, no intervention with the torque generating system is required. Otherwise, however, $\hat{H}$ must be modified by an intervention such that the inequality is once again fulfilled. For this purpose, a suitably determined small angular momentum change $\Delta \hat{H}$ can be effected according to:

$$\Delta \hat{H} = (\hat{M}_x \Delta t_x, \hat{M}_y \Delta t_y, \hat{M}_z \Delta t_z)^T \qquad (31)$$

with torques $\hat{M}_i$ (i=x,y,z) being exerted in the form of pulses over each time interval $\Delta t_i$ (for example by the position control jets that act in all three axes). The torques $\hat{M}_i$ can be made positive or negative in each case; it is merely necessary to fulfill the following inequality as a result:

$$(Ib \times b)^T \cdot (\hat{H} + \Delta \hat{H}) \geq 0. \qquad (32)$$

After introducing vector Z $$Z \equiv (z_x, z_y, z_z)^T = (Ib) \times b \qquad (33)$$

the further requirement is obtained:

$$z_x \hat{M}_x \Delta t_x + z_y \hat{M}_y \Delta t_y + z_z \hat{M}_z \Delta t_z \geq -(Ib \times b)^T \cdot \hat{H} = -z_x \hat{H}_x - z_y \hat{H}_y - z_z \hat{H}_z. \qquad (34)$$

This inequality can be fulfilled component wise, for example. If the undesirable case $Z \cdot \hat{H} < 0$ occurs according to inequality (27), the following must apply for at least one component:

$$z_i \hat{H}_i < 0.$$

In this case, the choice can be made as follows:

$$z_i \Delta \hat{H}_i = z_i \hat{M}_i \Delta t_i \geq |z_i \hat{H}_i| \qquad (36)$$

or $$\Delta t_i \geq \left| \frac{\hat{H}_i}{\hat{M}_i} \right| \qquad (37)$$

$$\text{sign} \hat{M}_i = \text{sign} Z_i = -\text{sign} \hat{H}_i.$$

Other objects, advantages and novel features of the present invention will become apparent from the following detailed description of the invention when considered in conjunction with the accompanying drawings.

BRIEF DESCRIPTION OF THE DRAWING

The single FIGURE of the drawing shows a conceptual block diagram of the arrangement for angular momentum determination according to the invention.

DETAILED DESCRIPTION OF THE DRAWING

The FIGURE shows a magnetometer 1, a computer 10, memories 2 and 20, and a system of jets 3 acting in three axes. Magnetometer 1 measures the current values of magnetic field vector $B(t_k)$ at successive time points $t_k (k \geq 1)$ which are separated from one another by time or scanning intervals $\Delta_j = t_{k-1}$:

$$B(t_k) = (B_x(t_k), B_y(t_k), B_z(t_k))^T \tag{38}$$

and feeds the measured values to a memory block 22. Next the time derivative $\dot{B}(t_k)$ of the magnetic field vector $B(t_k)$ is determined in a computer block 11, for example with the aid of the statement $$\dot{B} = \frac{s}{1 + sT} B_m \tag{39}$$

where s is the Laplacian or differential operator and T is a time constant, and also by means of the definition $$C = \frac{B_m}{1 + sT} \tag{40}$$

From this it follows that:

$$C + T\dot{C} = B_m \tag{41}$$

$$\dot{C} = \frac{1}{T}(B_m - C) = \dot{B} \tag{42}$$

since, because of (39) and (40):

$$\dot{C} = sC = \dot{B}. \tag{43}$$

From Equation (42) we have the following for the numerical processing:

$$C(t_k) = C(t_{k-1}) + \Delta \frac{t}{T}(B(t_{k-1}) - C(t_{k-1})) \tag{44}$$

$$\dot{B}(t_k) = \frac{1}{T}(B(t_k) - C(t_k)). \tag{45}$$

Computer block 11 determines $\dot{B}(t_k)$ using these equations, with parameters T and $\Delta t$ being taken from memory 2 and the values relating to the previous point in time $t_{k-1}$ being taken from memory block 22. The current value $B(t_k)$ is obtained from magnetometer 1.

The auxiliary values $C(t_k)$ are each fed to a memory block 21 and the values of $C(t_{k-1})$ already stored there are removed from the memory. (The values $B(t_0)$ and $C(t_0) = B(t_0)$ are entered as initial values into memory blocks 22 and 21 at the beginning, and are called up during the first computing step at time point $t_1$ for computer 11.)

The derivative $\dot{B}(t_k)$ is input to another computer block 12 where the rotational speed vector $\omega_m$ is determined in accordance with Formula (4), using the current value of $B(t_k)$.

Then, in a computer block 13, vector $b(t_k)$, matrix $A(t_k)$, and vector $Y(t_k)$ are determined in accordance with equations (5), (6), and (10) as well as (15), and these values are entered in a memory block 23. Matrix $A(t_k)$ is fed to another computer block 14 where, after calculation of matrix $R(t_k)$ according to (25) by means of inertia matrix I and the estimated value $\hat{H}(t_{k-1})$ taken from a memory 25, matrix $N(t_k)$ is determined by multiplication according to (24). Then the starting matrix $K(t_k)$ is determined in such fashion that the matrix $P(t_k)$ formed from K, $K^T$, and N according to (23) is positively definite or positively semi-definite. This can take place for example in accordance with equation (28), so that expression (29) results for P. At the beginning, initial value $\hat{H}(t_0)$ must be fed to memory 25, so that a corresponding value is available to computer block 14 for the first computer step (k=1). The current value for matrix $K(t_k)$ is entered in a memory 24.

The observer equation (17) is then integrated in computer 15. For this purpose, the following form is used as a basis for numerical processing:

$$\hat{H}(t_k) = \hat{H}(t_{k-1}) + \Delta \hat{H}(t_{k-1}) + \Delta t \, [\hat{H}(t_{k-1}) \times I^{-1} \hat{H}(t_{k-1}) + \tag{46}$$

$$I^{-1} A^T(t_{k-1}) K(t_{k-1}) (Y(t_{k-1}) - A(t_{k-1}) I^{-1} \hat{H}(t_{k-1}))]$$

The parameters for $\Delta t$ and I are taken from memory 2, and the matrices and vectors related to the previous point in time $t_{k-1}$ are taken from memories 23, 24, 25, and 29. This integration is performed for each current point in time $t_k$ and the result $\hat{H}(t_k)$ is fed first to memory block 25 and then to computer block 16, which determines component $P_{33}$ of matrix P in accordance with specification (29), using the current value of $b(t_k)$ and the previously given parameter value I. In a comparator 17, the scalar value $P_{33}$ is then checked to determine whether $P_{33} \geq 0$, as required by specification (27). If so, the value zero is fed to memory 29 as the current value of $\Delta \hat{H}(t_k)$. Otherwise, the critical values for triggering torque pulses $\hat{M}_i \Delta t_i$ (or a corresponding change in the angular momentum $\Delta \hat{H}$ according to (31)), are determined in a computer 19, equation (32). The length of time intervals (pulse durations) $\Delta t_i$ (i=x,y,z) can then be determined in accordance with (37), with $\hat{M}_i$ representing the torques that can be generated in the three axes, whose preset values can be obtained from memory block 2.

The change in angular momentum $\Delta \hat{H}(t_k)$ to be formed in accordance with (31) is then entered in memory 29 and the values obtained for the time intervals $\Delta t_i(t_k)$ are fed to jet system 3 to produce the corresponding torque pulses $\hat{M}_i \Delta t_i$.

The computation cycle described above is performed at the beginning of each new scanning interval $\Delta t_k$ during a time that is very short relative to the duration of $\Delta t_k$. (For example such computation requires about 2 msec, compared to the scanning interval of approximately 250 msec.) The computation process converges more rapidly (i.e. the number of required integration steps in computer 15 becomes smaller) the greater the extent to which requirements (32) and (27) are met. When the torque generating system is used (jet system) this therefore depends on the degree of "over-fulfillment" of requirement (37), with which however an increase in energy consumption, for example jet fuel, is associated.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for determining an angular momentum vector H of an object located in an externally generated magnetic field B, relative to an orthogonal system of coordinates whose axes x,y,z coincide with main inertia axes of the object, said object having a magnetometer for measuring magnetic field strength in the direction of said x, y and z axes, and a torque generating system for producing torque pulses about all three axes, said method comprising the steps of:

measuring magnetic field strength B of said externally generated magnetic field along said x, y and z axes by means of said magnetometer, wherein $B=(B_i)^T$ ($i=x_1y,z$);

entering measured values of said magnetic field strength B into a computer;

said computer calculating estimated values $\hat{H}$ of angular momentum of said object at successive points in time, for each calculation using most recently measured values of said magnetic field strength and integrating the observer equation $$\dot{\hat{H}}=\hat{H}\times I^{-1}\hat{H}+I^{-1}A^TK(Y-AI^{-1}\hat{H})+\hat{M}$$

with $$Y\equiv\frac{B\times\dot{B}}{|B|^2}$$

wherein $\hat{M}$ is an estimated value for an angular torque vector; I is an inertia matrix of the satellite, and $I^{-1}$ is its inverse matrix; A is a quadratic matrix of rank 3 with three mutually orthogonal line vectors, one of which coincides with a normalized magnetic field vector $b\equiv B/|B|$, and $A^T$ is its transposed matrix; K is a quadratic starting matrix $K=(k_{lm})$ with rank 3 (l,m=1,2,3), with coefficients $k_{lm}$ equal to zero in a column whose number coincides with a number of the line in matrix A in which the normalized magnetic field vector b is located, and whose other coefficients must be determined in such fashion that the matrix $$P=\frac{1}{2}K+\frac{1}{2}K^T-N$$

is positively definite or semi-definite; with $$N=ARA^T$$

$$R=\frac{1}{2}\begin{pmatrix} 0 & \hat{H}_z(I_y-I_x) & \hat{H}_y(I_x-I_z) \\ \hat{H}_z(I_y-I_x) & 0 & \hat{H}_x(I_z-I_y) \\ \hat{H}_y(I_x-I_z) & \hat{H}_x(I_z-I_y) & 0 \end{pmatrix}$$

wherein $I_{x,y,z}$ represent diagonal components of inertia matrix I;

continuously checking calculated values $\hat{H}$ and current measured values of said normalized magnetic field vector b to determine whether an inequality $$(Ib\times b)^T\hat{H}\geq 0$$

is satisfied;

if said inequality is not satisfied, said torque generating system applying a torque $M=(M_x,M_y,M_z)^T$ to said object for time intervals $\Delta t_x, \Delta t_y, \Delta t_z$, to cause a change in angular momentum $\Delta\hat{H}=(\hat{M}_i\Delta t_i)^T$ whereby said inequality is satisfied; and performing successive integrations until such integrations no longer result in a change in $|\hat{H}|$, whereby the calculated value of $\hat{H}$ is equal to an actual angular momentum vector H of said object.

2. Method according to claim 1 wherein the following relationship is created between the elements of matrix $K\equiv(k_{lm})$ and those of matrix $N\equiv(n_{lm})$:

$$K\equiv(k_{lm})=\begin{pmatrix} n_{11}+c_1 & n_{12} & 0 \\ n_{12} & n_{22}+c_2 & 0 \\ 2n_{13} & 2n_{23} & 0 \end{pmatrix}$$

where $c_{1,2}>0$, so that:

$$P=\begin{pmatrix} c_1 & 0 & 0 \\ 0 & c_2 & 0 \\ 0 & 0 & (Ib\times b)^T\hat{H} \end{pmatrix}.$$

3. Method according to claim 1 wherein time intervals $\Delta t_i$ according to the requirement $$\Delta t_i\geq\left|\frac{\hat{H}_i}{\hat{M}_i}\right|$$

are determined, with the following still being valid:

$$\text{sign }\hat{M}_i=\text{sign}[(Ib)\times b]_i=-\text{sign}\hat{H}_i.$$

4. Method according to claim 1 wherein two line vectors of matrix A that do not coincide with the normalized magnetic field vector b in the case $|b_z|=1$ become $$a_1=(1,0,0)^T, a_2=(0,1,0)^T\text{sign }b_z$$

and in the case $|b_z|<1$ become $$a_1\equiv(a_{11},a_{12},a_{13})^T=\left(\frac{-b_y}{\sqrt{b_x^2+b_y^2}},\frac{b_x}{\sqrt{b_x^2+b_y^2}},0\right)^T$$

$$a_2\equiv(a_{21},a_{22},a_{23})^T=\left(\frac{-b_xb_z}{\sqrt{b_x^2+b_y^2}},\frac{-b_yb_z}{\sqrt{b_x^2+b_y^2}},\sqrt{b_x^2+b_y^2}\right)^T$$

with the following for A:

$$A=\begin{pmatrix} a_{11} & a_{12} & a_{13} \\ a_{21} & a_{22} & a_{23} \\ b_x & b_y & b_z \end{pmatrix}.$$

5. Method for determining an angular momentum vector H of an object located in an externally generated magnetic field B, relative to an orthogonal system of coordinates whose axes x,y,z coincide with main inertia axes of the object, said object having a magnetometer for measuring magnetic field strength on said x, y and z axes, and a torque generating system for producing torque pulses about all three axes, said method comprising the steps of:

measuring magnetic field strength B of said externally generated magnetic field along said x, y and z axes by means of said magnetometers, wherein $B=(B_i)^T$ ($i=x_1y,z$);

calculating estimated values $\hat{H}$ of angular momentum of said object at successive points in time using measured values of magnetic field strength according to a predetermined formula using said measured values of magnetic field strength;

after each calculation of $\hat{H}$, using a most recently calculated value of $\hat{H}$, current measured values of said magnetic field strength and inertia parameters of said object to determine whether a predetermined convergence criterion is satisfied;

if said predetermined convergence criterion is not satisfied, said torque generating system applying incremental torque impulses to said object on said x, y and z axes, said impulses having a magnitude and duration such that said convergence criterion is satisfied; and repeating said process until successive calculations result in no change in said estimated value of angular momentum, whereby said estimated value of angular momentum equals actual angular momentum of said object.

6. Apparatus for determining an angular momentum vector H of a satellite located in an externally generated magnetic field, relative to an orthogonal system of coordinates whose axes x, y and z coincide with main inertia axes of the object, said apparatus comprising:

a magnetometer for measuring magnetic field strength of said externally generated magnetic field along said x, y and z axes;

a computer coupled to receive measured values of magnetic field strength from said magnetometer, for calculating estimated values $\hat{H}$ of angular momentum of said satellite at successive points in time according to a predetermined formula using said measured values of magnetic field strength;

means responsive to each calculation of an estimated value of angular momentum, for determining whether a predetermined convergence criterion is satisfied, based on a most recently calculated value of angular momentum, current measured values of said magnetic field strength and inertia parameters of said satellite;

means operative when said convergence criterion is not satisfied for applying incremental torque impulses to said satellite on said x, y and z axes, said impulses having a magnitude and duration such that said convergence criterion is satisfied; and means for reading said estimated value of angular momentum as an actual value of angular momentum of said satellite when successive calculations of said estimated angular momentum $\hat{H}$ produce no change therein.

* * * * *